(12) United States Patent
Radulovic

(10) Patent No.: US 7,215,663 B1
(45) Date of Patent: May 8, 2007

(54) PRIVATE IP COMMUNICATION NETWORK ARCHITECTURE

(75) Inventor: Alex Radulovic, Salt Lake City, UT (US)

(73) Assignee: C2 Global Technologies, Inc., Toronto (CA)

(*) Notice: Subject to any disclaimer, the term of this patent is extended or adjusted under 35 U.S.C. 154(b) by 513 days.

(21) Appl. No.: 09/655,659

(22) Filed: Sep. 6, 2000

Related U.S. Application Data

(63) Continuation-in-part of application No. 08/599,238, filed on Feb. 9, 1996, now abandoned, and a continuation-in-part of application No. 08/585,628, filed on Jan. 16, 1996, now abandoned.

(51) Int. Cl.
*H04L 12/56* (2006.01)

(52) U.S. Cl. .................. 370/356; 370/401

(58) Field of Classification Search ............. 370/259, 370/260, 261, 351, 352, 356, 401, 464, 465, 370/466, 467
See application file for complete search history.

(56) References Cited

U.S. PATENT DOCUMENTS

| | | | |
|---|---|---|---|
| 4,994,926 A | 2/1991 | Gordon et al. | 358/400 |
| 5,291,302 A | 3/1994 | Gordon et al. | 358/400 |
| 5,459,584 A | 10/1995 | Gordon et al. | 358/434 |
| 5,471,470 A * | 11/1995 | Sharma et al. | 370/271 |
| 5,636,218 A * | 6/1997 | Ishikawa et al. | 370/401 |

(Continued)

FOREIGN PATENT DOCUMENTS

| CA | 1329852 | 9/1989 | |
|---|---|---|---|
| WO | WO 97/26753 | * | 7/1997 |
| WO | WO 97/29581 | * | 8/1997 |

OTHER PUBLICATIONS

Thom, Gary. "H.323: The Multimedia Communications Standard for Local Area Networks". IEEE. Dec. 1996. pp. 52-56.*

(Continued)

*Primary Examiner*—Derrick W. Ferris
(74) *Attorney, Agent, or Firm*—Workman Nydegger; Jonathan W. Richards; Wesley C. Rosander

(57) ABSTRACT

A disclosed Internet Linked Network Architecture delivers telecommunication type services across a network utilizing digital technology. The unique breadth and flexibility of telecommunication services offered by the Internet Linked Network Architecture flow directly from the network over which they are delivered and the underlying design principles and architectural decisions employed during its creation. The present invention supports current telecommunication and voice over IP standards and applications. This new network not only replaces the telecommunication network presently in place, but it also offers a more feature rich and cost effective alternative. For example, traditional telecommunication switches are more expensive, less reliable and slower than the faster digital data switches utilized in the present invention. Furthermore, the programmable nature of the digital devices comprising the present invention allows the new network to be built with a scalable and extensible architecture, providing the flexibility necessary to incorporate new or future digital enhancements. The inventive network is designed as a complete replacement for the traditional telecom network. The disclosed architecture allows for this network to connect to traditional networks and allows for an upgrade path. The design is robust and scalable so this network can introduce new features and functionality while preserving the quality of traditional networks.

39 Claims, 5 Drawing Sheets

U.S. PATENT DOCUMENTS

| | | | |
|---|---|---|---|
| 6,504,838 B1* | 1/2003 | Kwan | 370/352 |
| 6,519,249 B1* | 2/2003 | Bennefeld et al. | 370/352 |
| 6,529,499 B1* | 3/2003 | Doshi et al. | 370/352 |
| 6,842,447 B1* | 1/2005 | Cannon | 370/352 |
| 6,856,676 B1* | 2/2005 | Pirot et al. | 379/201.01 |
| 6,918,034 B1* | 7/2005 | Sengodan et al. | 713/160 |
| 2001/0046234 A1* | 11/2001 | Agrawal et al. | 370/402 |

OTHER PUBLICATIONS

Korpi et al. "Supplementary Services in the H.323 IP Telephony Network". IEEE. Jul. 1999. pp. 118-125.*

Vaha-Sipila, A. "RFC 2806—URLS for Telephone Calls". ITU-T. Apr. 2000. pp. 1-19.*

Cassing, Dave. "C6x Solutions for Voice Over IP Gateway". IEEE. Oct. 21-23, 1998. pp. 74-85.*

* cited by examiner

PRIVATE IP COMMUNICATION NETWORK ARCHITECTURE

RELATED APPLICATIONS

This application is a continuation-in-part of application Ser. No. 08/599,238, filed Feb. 9, 1996, now abandoned, entitled VOICE INTERNET TRANSMISSION SYSTEM to Wilkes et al. and Ser. No. 08/585,628, filed Jan. 16, 1996, now abandoned, entitled FACSIMILE INTERNET TRANSMISSION SYSTEM to Wilkes et al., each of which are incorporated herein by reference.

BACKGROUND OF THE INVENTION

1. The Field of the Invention

The present invention relates generally to multimedia communication networks. More particularly, embodiments of the present invention relate to an improved Voice over Internet Protocol (VoIP) network that provides for increased data stream throughput for video/voice/data via a private Internet Protocol (IP) communications network with associated communications components.

2. Description of Related Art

To understand the need for the improved design of the present invention requires a brief overview of the current solutions that need to be replaced, the available technology, and the areas of anticipated future growth. As none of the existing VoIP standards support all necessary telephony signals and messages, vendors develop special proprietary messages and controls to allow important features. Therefore, the current market products do not interact at the capacity required to offer carriers separate high performance, scalable, and reliable building blocks to build viable nationwide VoIP networks.

The public switched telephone network (PSTN) was built over many decades to accommodate basic telephony communications. As a result, other types of signals, such as data, video, and fax are presently formatted inefficiently to fit into the framework of the voice structure in the PSTN network. Presently, the telecommunication industry is undergoing a dramatic reorganization and reconnection. As newer technologies mature and develop, their deployment base, cost, and reliability approach the necessary size, expense, and dependability levels required to replace the old public switch technology. There is also a significant amount of engineering effort directed towards the selection of elements and components built for the PSTN that could be reused by a telephone network successor. Despite these changes, the infrastructure of the standard publicly switched telephone network (PSTN) has remained virtually the same. What is needed is a protocol and architecture that allows simple interfacing between new and legacy components.

The legacy PSTN supplies reliable and simple voice communication via an analog data transmission medium, but is not well suited for modern digital communication. While the public infrastructure actually consists of many different networks and technologies, much of the system can be characterized as having two inherent shortcomings. First, the reserved bandwidth in most voice calls is idle for much of the call duration, yet it is unavailable to carry other traffic, creating a systemic inefficiency. Second, the only intelligence in the system is found in the carrier's routing and control logic resident in the switches and control network. Basically analog local loops are connected to a local class five switch, which connects to other backbone and local switches through two separate networks. One network of inter-machine trunks carries the actual media traffic in the form of 64 kbs time division multiplexed (TDM) streams. A separate packet switched network carries call signaling, and control instructions using the SS7 protocol. As such, much of the logic for call connection and routing is resident in the switches, but additional logic for services, such as 800 number services, is drawn from Service Control Point databases on the SS7 network. When a call is placed on this network, instructions sent over the control layer allocate physical resources (ports and bandwidth) in the transport layer, creating a private channel of fixed bandwidth that is maintained for the duration of the call. In essence, this is a system that is highly adapted to a limited, historic set of functions, and which is not readily adaptable to new types of services or a wider range of media inputs. What is needed is a distributed architecture that allows data to be transmitted via a variety of message types optimized for the data being sent and for the network being used.

In contrast to the PSTN, the Internet supplies reliable and rapid computer data transmission without the added burden of long-distance charges. Originally developed by the government to facilitate communication in adverse conditions, the DARPA project consisted of a computer network that did not rely on any single node or cable for its existence. DARPA was specifically developed to provide multiple pathways for communication to flow from a source to a destination. Data can thus be routed along a large variety of pathways, successful transmission is not dependent on any one single pathway for a majority of the message to be successfully delivered. The successor to the DARPA project is the popular and widely used Internet. Transmission of analog or voice data via the Internet is viable because voice data can be digitized and the Internet is a global transmission medium, which substantially duplicates the area covered by the PSTN. An even greater advantage is the fact that Internet access generally includes all data transmission fees in the base cost unlike the PSTN were the base cost only includes connectivity and the user pays additional fees for data transmission, such as long distance calls. Presently available PSTN systems cannot supply high connectivity without adding unreasonable restrictions. Such systems should also supply support for multi-media and variable message types. What is needed is a protocol and architecture that takes advantage of the Internet's high connectivity, natural command and control infrastructure, multimedia support, and uses low cost and low complexity internet-scalable devices The standards organizations do not keep pace with modern technological developments, due in part to the fact that the standards organizations are very political and the increasing speed at which products are developed in the "Internet economy". Generally a selected protocol tends to give technological preference to one vendor over another, so the various vendors participating in the standards committees are naturally at odds with proposals presented by other vendors. This slows the progress, development, and the performance of the standards eventually implemented. What is needed is a truly efficient, interoperable and carrier grade protocol for use over a packetized network. The standards organizations, in general, and the VoIP market, in particular, are fragmented with many different protocols that compete and overlap. Presently, the two major VoIP protocols competing in the carrier market space are H.323 and SIP.

Developed originally for the transfer of multi-media signals over non-reliable networks (such as LAN), H.323 has been transformed in an attempt to meet the needs of a true carrier grade network. Although it is an approved standard by the International Telecommunication Union (ITU), the H.323 protocol faces significant opposition in the market due to its high complexity and lack of complete carrier grade support. In theory, H.323 should enable users to participate in the same conference even though they are using different videoconferencing applications. But it's too early to say whether such adherence will actually result in interoperability, even though most videoconferencing vendors have announced that their products will conform to H.323. What is needed is a packetized communication protocol that provides carrier grade support through simple compatible building blocks.

A much simpler and modern protocol, SIP places special emphasis on SS7 support. As the SIP protocol is still secondary in the industry to H.323 in terms of deployment and support by vendors, the future of the SIP protocol is unclear. What is needed is a communication protocol that supplies an open interface to existing and emerging standards, such as SS7 and H.323.

As attention to VoIP rises, there is an increasing collection of vendors in the market. Many of these vendors have developed products that work well in labs or small-scale installations; however, they are completely unsuitable for a carrier grade network requiring a call capacity of many millions of calls per hour. Obtaining carrier grade performance should be one of the driving forces in the design of any new network component or network architecture. What is needed is a network architecture that designs each component, which could cause a bottleneck, as a distributed application, thereby enabling replication of the resource to enhance overall network capacity.

SUMMARY OF THE INVENTION

The present invention has been developed in response to the current state of the art and, in particular, in response to these and other problems and needs that have not been fully or completely solved by currently available communication networks. Processing power (i.e., computers along with the internet infrastructure and data networking), has reached a level where the technology implemented in the IP world may be utilized as a catalyst for change in the telecommunications industry. For example, an Internet router is capable of routing many times more data than a traditional telecom switch that costs several orders of magnitude more than the Internet router. Furthermore, more IP connections are made on a daily basis than traditional telecom connections for phone calls in a month. As such, the base technology necessary to replace an archaic telecom network is clearly available today. The problem solved by the present invention is the method and system to implement a network, which delivers telecom type services on a network built with new Internet communication technology. This network not only replaces the current solution, but also offers a more feature rich and cost effective alternative. Furthermore, the present invention contains the ability for expansion via a scalable and extensible architecture to keep up with the growth of the telecom industry. Thus, the present invention provides a replacement for the technology of an outdated operating multibillion dollar infrastructure, which is cheaper, more efficient and more reliable.

Furthermore, it is an overall object of the present invention to provide a VoIP communication network that has a real time voice and data transmission profile and is particularly useful in telephone communications implemented in a VoIP environment, such as in a communication AppCenter, local exchange or other private telephone network. More specifically, the present invention relates to a system and method relating to a private IP communication network architecture facilitating audio, data, video, electrical, and logical connections between two users.

One advantage of the present invention is to provide a protocol and network architecture that allows communication between new and legacy components via a translation interface module.

Another advantage of the present invention is to provide a user with a variety of message types that can be optimized according to the type of data being sent, such as voice, video, or data. The distributed network architecture also allows for the creation of a large fault tolerant system that does not incur the performance and operational costs and complexities associated with building a large monolithic system. Much like the differences between Mainframe and local area network (LAN) computer environments. In the distributed network architecture, transmitted data is identified and optimized by pooling data into categorized data packet types allowing decisions to be made on how this data should be handled and exchanged between servers along the various network types, such as a real time packetized network or PSTN network, available to the user. Yet another advantage of the present invention is the natural command and control infrastructure supplied by the packetized network based architecture, namely, enhanced connectivity and scalability for attached communication devices in a carrier grade network. While a packetized network does not guarantee that all the advantages of an IP network will be available by default, ATM is an example. The present invention utilizes the packetized network and IP protocol to provide the ability address other devices without knowing where the device is or how to get to it. Thereby separating network from application. The advantage of the system we are describing is that this feature of IP networks has been sustained throughout the architecture.

In summary, the foregoing and other objects, advantages and features are achieved with an improved communication network for use in connecting multimedia devices, such as video, voice, data, other telephony devices, and the like to remote access points and associated communication devices attached to those points, such as modems, telephones, video displays, and network interface cards (NICs). Embodiments of the present invention are particularly suitable for use with such telephony devices that are used in a typical local exchange having one or more jacks or sockets designed to accommodate communication devices. For example, a telephone having an RJ type connector that is inserted into the socket or jack in such a way that the telephone is in communication with the network and may selectively dial a second telephony device via the network.

In a preferred embodiment, the communication network maintains three layers for each connection, more specifically a physical layer, a network layer, and a service layer. The physical layer is created via the existing IP network, such as the Internet, a private IP network, real time IP network, or combination thereof. A network layer generates a connection that is logically assigned via participating network devices, and finally a service layer generates logical connections necessary to run the desired application. By creating three independent layers the communication network is given the advantages of a distributed network along with the advantages of component specialization and optimization associated with the physical, logical, and service layers. In designing the components of this new communication network, the present invention employs, but is not limited to, elements from Q.931 and SS7 as a basis for call control. A structured, scalable architecture is provided through the defined components and their responsibility.

The network layer comprises at least one central arbitration server (CAS) or gatekeeper, at least one communications engine (CE) or gateway, where both devices are running the Internet Media Control Protocol (IMCP). The CAS is a fault tolerant set of servers that act as gatekeepers on the network. The CAS is responsible for arbitrating resource allocation, passing call control information and collecting billing records. The CE is the network implementation of a voice-over IP (VoIP) gateway. This gateway is built to use the IMCP protocol to take part in the private communication network. The network CE can handle both customer based signaling, such as ISDN-PRI, and carrier signaling, such as SS7. One example of an additional network layer device is a NetLink-IP device (C4). The C4 provides network users with multiple phone lines and a persistent or continuous Internet connection over a single data connection.

The service layer includes V-Link platform and services and the GateLink API layer. The service layer brings intelligence to the network. V-Link is an example of a VoIP based enhanced service. The network GateLink API offers access to the communication network to third party software developers. The API gives a software abstraction to all the resources on the network. Thereby enabling the creation of application modules, such as a voice portal, a unified message service, and automatic call distribution (ACD) service.

In considering these factors, the following principles concerning new telephone networks are observed by the present invention. First, support for legacy and current communication standards and applications are available within the network. Second, the network satisfies legacy, scalability, and reliability requirements of modern global business models. Third, the network provides support for future communication features through generalized buses and standardized communication protocols. Fourth, the network uses an open architecture for third party vendor products and service extensions.

Merely rebuilding the telecom network in order to emulate the old legacy technology is not in itself compelling, as the overall cost to replace the technology would be extreme. Despite the fact that the new digital components for the new network architecture would be less expensive and the overall network less cumbersome, the sheer size of the global communications network makes an immediate universal replacement virtually impossible. Instead the expectation is to replace the network in gradual steps over time. However, various features and services can be effectively added to the new private IP communication network in conjunction with many of the legacy components. Protocols, applications, and devices within the network are designed without limiting them to current uses, but offering an open adjustable, programmable network. The IMCP is extensible, allowing for additional fields within a message or new messages. For example, additional fields include optional data fields that a recipient need not understand (like SS7 information concerning a call to an analog line) or even new private message blocks sent between devices or applications.

On the service layer, GateLink is the API an enhanced service is built on. The GateLink API allows third party access to various network components. The API allows software control of various functions, such as making a call, detecting DTMF tones, sending a fax, recognizing speech, conferencing callers, and other functions. In this way the developer need not bother with the underlying hardware just to implement an application. The API approach makes the service layer of the present network architecture open and expandable to support future services.

As is expected, a new communications network cannot initially exist by itself. Before the entire telecom network is redeveloped, a transition is period required, during which the replacement network is capable of interconnecting with the older technology networks. This allows for a seamless integration in support of current network services, while allowing for a clear migration path for the industry. The Internet Media Control Protocol (IMCP), which is the protocol at the base of the present invention, implements a call control protocol based in part on the existing Q.931 standard, the same standard implemented in other networks. Also, there is native support in the gateways (CE) for protocols, such as ISDN-PRI and SS7. This means that without any additional modification or customization, the network system of the present invention can connect into ISDN and SS7 networks that presently exist today. The IMCP supports all current types of traffic carried on a PSTN voice call: voice, fax, and modem. From an outside user standpoint, the present invention looks like a traditional telecommunications network and yet due to the inherent limitations of the PSTN network many advanced features of this new network are not apparent. The inner workings that allow a lower cost and a higher functionality communications network are transparent to the external user.

Despite the available connectivity, the method and system disclosed in the present invention do not represent a communication network architecture intended to be grafted into a larger switched network, but rather, constitutes an independent, stand alone, VoIP network that features components with the scalability and versatility to surpass the service available via existing traditional networks. Users have the ability to crossover to the existing traditional telecommunication networks via translation modules, but this is a transitional element of the network. The challenges presented by the legacy communication networks during the transitional phase to a substitute or replacement communication network are resolved through integration or incorporation with other VoIP networks via translation modules. Moreover, the reliability of the present communication network is greatly increased by taking advantage of dispersed, replicated and scalable components and eliminating potential bottlenecks generally associated with PSTN, thereby lowering the overall cost and complexity of the connecting network. Often the real time IP network is able to facilitate these improvements through the mere addition of a server, as opposed to the building of the huge monolithic devices required by the PSTN.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof that are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
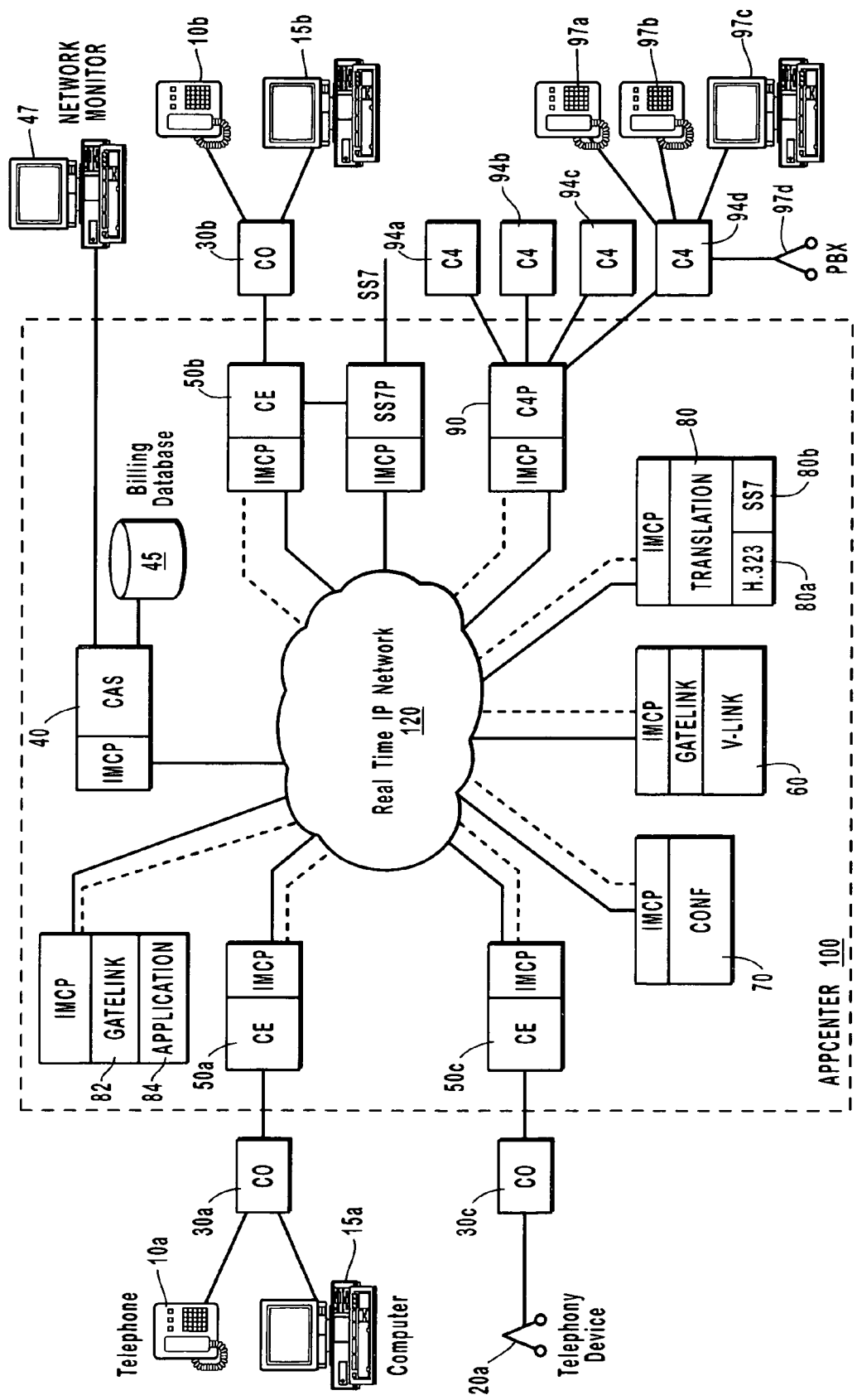
FIG. 1 illustrates an exemplary system that provides a suitable operating environment for the present invention.

Reference is first made to FIG. 1, which graphically illustrates an exemplary system or environment in which the present invention may be utilized or implemented. FIG. 1 is intended to be illustrative of potential systems that may utilize the present invention and is not to be construed as limiting. Telephone calling devices 10a, 10b are connected to central office (CO) 30a and 30b, respectively, via PSTN lines. CO 30a and 30b are electrically connected to the IP telephone gateways or communication engine (CE) 50a and 50b via PSTN connections or dedicated communication lines. Other telephony devices 20a are connected to the network via CO 30c that is connected to CE gateway 50c. CE gateway 50a, 50b, and 50c are all part of communication AppCenter 100, which may include, among other things, telephony gatekeeper or central arbitration server (CAS) 40, call detail record (CDR) database 45, network monitor 47, conference server 70, enhanced service platform (V-Link) 60, GateLink server 82 for running communication applications 84, translation module 80, and communication proxy switch (C4P) 90. However, not all the components are needed to be permanently associated with a single AppCenter. For example, a single CAS can operational sustain many AppCenters. Furthermore, the CDR database can be a central database that maintains all network activity. Even the conference servers and V-Link services can be centrally located and provided to an AppCenter on demand from a different location. Also the C4P and CE are not needed if the AppCenter does not connect to C4s or PSTN customers respectively.

In the illustrated configuration, each module is connected to CAS 40 and is logically interconnected during a call session with each other via a real time IP (RTIP) network 120. The RTIP network 120 comprising: a private IP network, Internet, wireless IP network or some combination of IP networks that enable suitable bandwidth for IP communication and more preferably real time IP communication. All network traffic, including voice and real time applications, is preferably connected via RTIP network 120. C4P 90 combines data received from network connections generally through local digital switch (C4) modules 94a, 94b, 94c, and 94d. C4 modules 94 are similar to local digital telephone exchange centers. Each C4 may have multiple telephone connections 97a and 97b, multiple computer connections 97c, or other attached telephony devices 97d, such as a PBX. As previously discussed, the private IP network can be separated into three layers and their components: the network layer contains the IMCP protocol, CAS 40, CE 50, and other access devices, including the C4 device; the application layer contains the GateLink API, the AppLink platform and other related resources; and lastly, the service layer contains application modules for enhanced services, such as voice portals, unified messaging, ACD services, and other advanced communication applications. The advantages and functions of each of these layers and component modules are described in more detail below.

Network Layer

The network layer encompasses both a protocol and a hardware network. The physical network hardware comprises the routers, DS-1/DS-3 links, PSTN connections, etc. The Internet Media Control Protocol (IMCP) contains a set of programming objects that control the resources available via the hardware network. For example, the protocol provides the mechanism for the network devices to communicate with each other, to reserve and control resources, and collect call detail records (CDR). The main network devices participating on the network layer are the central arbitration server (CAS) 40 and the communication engine (CE) 50. Other IMCP capable devices on the network include the C4 Proxy server (C4P) 90, GateLink 82, Conference servers 70, translation module 80, and V-Link servers 60.

In H.323 terms, CE 50 is, among other things, a digital gateway, and CAS 40 is a gatekeeper. The CE 50 is the proxy between the existing telephony networks and an IMCP interface with RTIP network 120. For example, the CE 50 may proxy as an ISDN-PRI interface for the PSTN lines attached to CO 30. To connect to an SS7 network, one network configuration uses a SS7 proxy (SS7P) to provide a SS7 signaling interface, while a separate CE 50b provides payload conversion, such as encoding, compression, and other IMCP formatting. CAS 40 is the connection control logic that maintains all network connections, resource allocation and provides necessary billing information in the CDR. The distributed network layer is intentionally designed with many redundancy components to handle CAS 40 or IP connections during fail-over situations. However during normal operations, a single CAS 40 easily carries millions of call setup requests per hour, due in part to the distributed nature of the network and the low complexity of the IMCP protocol. CAS 40 maintains resource allocation table, monitors network utilization, and tracks billing information for the CDR, but has no specific knowledge or responsibility of the applications using the resources. All other network devices support the IMCP protocol in the same manner as CE 50. CAS 40 does not differentiate among the network devices (conferencing, store & forward, client, text to speech, voice recognition, etc.). However, the IMCP protocol can carry special messages required to separately control the function of the different network devices.

ICMP

The Internet Media Control Protocol (IMCP) is at the lowest layer of the architecture. This is the protocol that all devices and applications use to connect and commune one with another. The IMCP protocol is designed to support the scalable and feature rich VoIP network. The guiding design principles for the IMCP protocol include: (1) reuse PSTN call setup protocol Q.931; (2) take advantage of the cost, performance, pervasiveness, and scalability benefits supplied through the IP protocol; (3) support a distributed, scalable architecture; (4) supply an open interface for other telecommunication networks, such as the SS7 and H.323; and (5) support a feature rich network application and device structure.

Figure 2B:
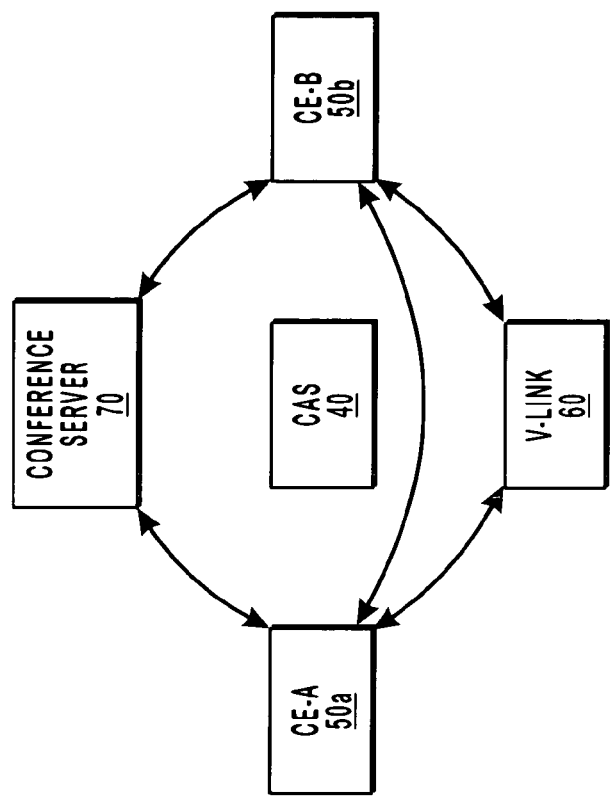
FIGS. 2a, 2b, 2c, 2d, 2e, and 2f are a block diagrams of the control and logical connections illustrating various call states available via the packetized real time communication network architecture illustrated in FIG. 1.
Figure 2A:
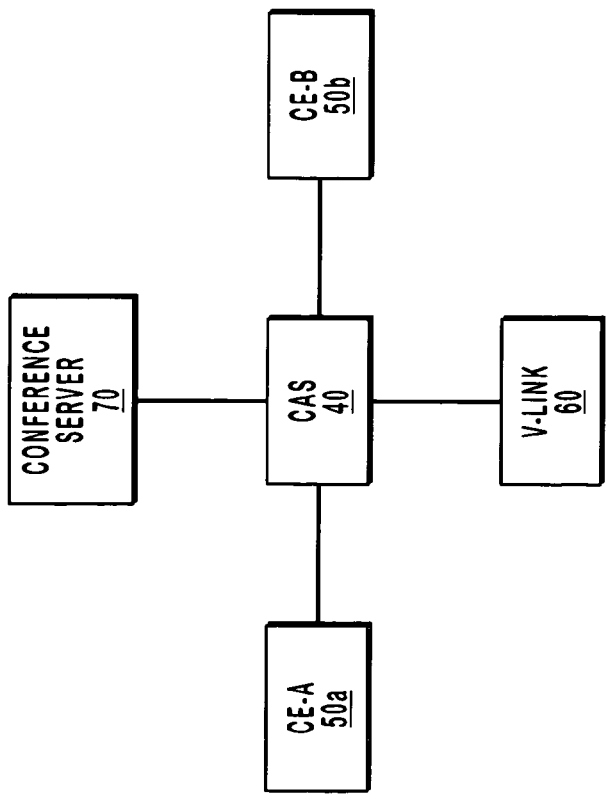

The IMCP protocol has two primary data activities: real time and control. The real time portion or IMCP-data transfer is designed to carry the payload or the media packets between two IMCP devices after a successful call setup. This would be, for example, voice, fax, modem, silence, background noise, video, or other data types in the future. The control portion of IMCP-call setup is designed to carry network events (DTMF and other tones), applications, data, or private data and is illustrated in FIG. 2a. IMCP-Call setup also defines the messages required to setup a call between two IMCP endpoints. The relationship of the real time portion to the control portion is illustrated in FIG. 2b.

In addition to supporting the most important features required by high quality telephony call setup, IMCP outperforms the basic requirements in some important aspects. For example, IMCP features fast setup time where multiple events are handled in the same message. Fast setup provides call setup times equivalent to or better than PSTN setup time. The faster call setup is due in part to the fact that VoIP network signaling is only performed at the end points and not at every switch along the call path. Additionally, the complexity required from an IMCP terminal is minimal. Low complexity minimizes the load requirements to process call setup, thereby allowing IMCP devices to be simple embedded devices. In this respect IMCP is similar to the SIP protocol, in that IMCP messages are text based and do not require special compilers or field allocation as in H.323 with ASN.1. While the text-based approach does require higher bandwidth, the complexity reduction during call setup outweighs this tradeoff. In fact, the overall higher bandwidth generates an insignificant amount of data when compared to the real-time payload data being transmitted in the overall scheme of the architecture. Another advantage of IMCP is the broad range of PSTN support available. As the basic IMCP call setup procedure is compliant with the Q.931 state machines, the interface to traditional PSTN networks is relatively straightforward. This also improves the integration time of new servers using off the shelf hardware and software components into the network. Yet another advantage of the text based IMCP is the inherent support for new message types. As the IMCP message format is text based, there are no coding limits and compatibility issues when new messages or message types are added, additional text fields are easily ignored. Finally, IMCP is the base protocol, so there are no lower layer protocols required. IMCP does not specify a lower layer protocol. Unlike SIP, which runs on top of the HTTP protocol, or the H.323 that requires an ASN.1 compiler and SSL, IMCP is simply integrated on top of the well-known TCP/IP and UDP/IP protocols. This feature allows IMCP quick and efficient integration to any device using a standard C compiler. Note that the IMCP call setup can be generalized to any IMCP device, whether it is a PSTN gateway (CE) or a store and forward resource. It can also be generalized to carry any type of media.

Another important feature supported by the IMCP protocol is the ability to transfer connections among IMCP devices. This is done by a LinkLine message, which transfers the real time connection to another IMCP device while keeping the control channel. This feature is important when a network is required to support enhanced features beyond a simple point-to-point connection. IMCP supplies the ability to transfer a call from one platform to another while maintaining a control path to the originating platform. For example, a calling card server will accept the first connection from the calling subscriber, will interact with the subscriber using common IVR techniques to authenticate the user and to collect the destination number. The server will than initiate another call setup to the destination number and once the call is accepted, will initiate a LinkLine request that will transfer the real time connection between the subscriber and the destination number. However, the server will maintain a control link to the originating CE 50 in order to play "out of credit" warnings or to accept special requests from the subscriber using her or his DTMF keypad. For the purpose of a connection control, the IMCP supports the transmission of the DTMF detected signals over the control channel throughout the call duration. This means that to support these features, the IMCP requires the originating CE 50 to detect and transfer the DTMF tones over the control channel.

A third feature supported by IMCP is the simple ability to add special messages among IMCP components. CAS 40 will typically just transfer these messages but may also decode them only for the purpose of special billing requests. Examples for these special messages are conferencing, IVR, text to speech and voice recognition control. This requires the IMCP components originating these messages to know the type of IMCP component connected to by CAS 40.

The real time network 120 is built to support Real-time Transport Protocol (RTP) and Internet Media Control Protocol—Real-time Transport (IMCP-RT). RTP itself does not guarantee real-time delivery of data, but it does provide mechanisms for the sending and receiving applications to support streaming data. Typically, RTP runs on top of the UDP protocol, although the specification is general enough to support other transport protocols. RTP has received wide industry support. As currently defined, RTP does not define any mechanisms for recovering for packet loss. Such mechanisms are likely to be highly dependent on the packet content and may be associated with the service layer and service layer of the present invention. For example, for audio, it has been suggested to add low-bit-rate redundancy, offset in time. For other applications, retransmission of lost packets may be appropriate. (The H.261 RTP payload definition offers such a mechanism.) This requires no additions to RTP. RTP probably has the necessary header information (like sequence numbers) for some forms of error recovery by retransmission. In the present invention RTP is supported equally to IMCP-RT.

The IMCP-RT is a lower overhead protocol designed to also carry information about the data it carries. If more than one frame is destined for the same destination, the IMCP layer will combine all the frames into a single UDP packet (or multiple packets in the case of a large number of connection packets.) This can reduce the network bandwidth up to 40% and more in a real world environment. The frames within the packet are also labeled with their content data type, such as voice, DTMF tones, facsimile, background noise, digital data, modem, silence, or other data type. This labeling allows the end device to process the frames without further analysis. A conferencing server would ignore packets labeled as silence or background noise since there would be no need to add this data to a conference call.

The control portion of the IMCP is a text-based protocol. All the data is sent as a value-name pair. This allows for extensible messages that need not carry all the optional fields if they are not used. It also allows for devices using different versions of the protocol to use the same packets if the higher version device has backward compatibility. Higher-level protocols, such as the call control, are implemented as a set of IMCP messages.

CAS

Every device in RTIP network 120 needs to be connected to CAS 40 via the IMCP in order to participate in the RTIP network 120. Only one connection is made during the entire uptime of the device. All calls, sessions, and ports for this devices are handled through the same connection. The devices communicate with CAS 40 for log on, resource allocation, and for data delivery. Data delivery may include delivering billing information, messages for call control observed by CAS 40, and private messages transmitted for any purpose. Data delivery may also involve private messages sent between devices and are passed unobserved by the users. This strategy allows CAS 40 to handle network problems in a reliable and efficient manner. For example, if a device, such as gateway, goes off the network for any reason, only one device needs to be reconnected (as opposed to reconnecting all the devices that are connected to it) since the remaining devices are still all logged into CAS 40.

Reliability is fundamental to any carrier grade solution. As such, every component within the present invention is redundant. The redundancy is loosely coupled without high complexity and cost mirroring. Furthermore, high profile software based components, such as CAS 40, have seamless redundancy. For example, if the network cable from CAS 40 is unplugged the system will not lose a single billing record nor will the disconnection affect a call in progress. This occurs in part, because all the network devices will switch to a redundant CAS. Once the cable is plugged back in, CAS 40 uploads the billing records and continues operating. The calls in progress are not affected because payload is transmitted directly between the end units that carry the voice or other data packets between the connected users participating in the call. Only the IMCP control messages are routed via CAS 40, so that calls in progress can continue uninterrupted by a disconnected CAS. The originating and receiving units switch to the redundant CAS and deliver what information they have about their current state. The control data being sent to the redundant CAS is not as time sensitive as the voice data and can absorb any delay introduced by a fail over. In one configuration of an AppCenter, multiple CAS units are available so that the device control lines can be transferred to an operating CAS in fail-over situations.

Thus the present invention is designed for reliability on multiple layers. Separating functionality, like application from network, allows for a robust scalable architecture. For example, on the service layer, AppLink is built to recover from the database failure. If the database connection is lost, the AppLink server will reconnect without even returning the application an error, thereby ensuring the caller an uninterrupted telephone session.

CAS 40 is similar to a gatekeeper in an H.323 network or a SCP in an SS7 network. However, the primary responsibilities of CAS 40 are to keep track of resource utilization, pass information between devices, collect billing information and collect and deliver monitoring information about the devices it manages. As such CAS 40 is the perfect device from which a network monitor 47 or billing database 45 can obtain their information.

CAS 40 is a distributed application that enables resource replication to enhance the overall network system by adding new devices, applications, and components. Replication allows the singular network device performance to be amplified by replicating a device on the network. For example, using currently available hardware configurations a single CAS can handle at least five million calls an hour, a single AppLink server can control at least one thousand enhanced service sessions, where the typical delay from the time a network event occurs until it is visible on a maintenance console or network monitor 47 is about fifty milliseconds, and the typical time to reload a route table containing all routes for the entire communication system while CAS 40 is running at a high load stress is about three seconds.

In an alternative configuration, CAS 40 is also a distributed application that enables resource replication to enhance the overall network capacity. Also, replication allows a distributed application on a network to get more than one thousand enhanced service sessions simply by adding another GateLink server.

As a result of the network layer architecture and the IMCP, additional operational features are available to the network. The two most important features are CDR collection and system monitoring. Both of these features are directly related to the fact the all IMCP messages are routed through the CAS. The CAS sees all the call control messages and can populate all CDR by default with: originating and terminating number; CE line; and trunk group and call start, answer, and end. In addition the CAS allows for extensible CDR allowing the application to add any fields needed to completely describe a call like type of service for instance. Also CAS allows an application to "group" CDR together with a "key" to allow later bill creation to present a complex session like a conference call in a way the customer will understand. System monitoring is possible since the CAS has all the states of all the lines of the devices in the network. The CAS contains information if a line is active and what other device it is connected to and for how long. Depending on the application and system management tools, this architecture can be extended to provide carrier grade services in both a scalable and reliable manner.

CE

Communication engine (CE) 50 is a VoIP gateway in the private IP network. The CE uses IMCP to communicate. In one embodiment, CE 50 is an industrial PC with enough network cards and DSP resources to handle ten T1 lines worth of telephone calls. Future plans for an embedded version and larger, compact PCI version will enable CE 50 to carry more calls and be more reliable. CE 50 acts like a gateway from an information poor PSTN signal to an information rich IMCP network. CE 50 can not only compress voice data but identifies and categorizes the data. Packets are labeled as voice, silence, background noise, DTMF tones, fax, or modem. In addition, fax traffic is demodulated and the raw T.30 information is sent in the packets. This allows other devices and applications to manipulate the data without the need of further DSP analysis. IVR (Integrated Voice Response) systems can detect a DTMF tone by checking for DTMF packets. A voice recognition server can detect when an end of a word occurs by the silence packets. Yet another application provides a store and forward fax solution, which uses the T.30 information to create an IP based fax service. More specifically, the CE recognizes the PCM or modulate wave signal from the facsimile device and repackages the information into modules, such as V.17, FSK, and CNG for transmission to a GateLink server running the IP based fax service application. An application running a fax service via the GateLink API is then able to access a T.30 state machine for operations, such as "send fax" and "receive fax", on the GateLink server without needing to interpret PCM. The fax service application would then be able to generate .TIFF, .JPG, GIF, or other similar graphics file types of the original fax. As described the CE must repackage the PCM data through demodulation into new modules without performing any DSP operations. The DSP operations are accomplished on the GateLink server via the fax service application. The CE, in short, is the electrical muscle for the brains, which reside on the service layer.

C4

The NetLink-IP (C4) 95 is an example of the next generation of access devices attached to RTIP network 120. C4 95 allows the network the ability to offer a customer multiple phone lines and a persistent Internet connection over a single data line connection. C4 95 is the first integrated CPE to connect to a VoIP network and deliver all the services that previously required the use of class 5 switches. C4 95 delivers the intelligence and benefits of the previously described RTIP network 120 all the way to the consumer.

In summary, the user is connected to RTIP network 120 from the time they pick up their handset without having the traditional telecom network to limit the control and features that RTIP network 120 can provide to the user. RTIP network 120 is designed as a complete replacement for the traditional telecom networks. Thus, the new C4 architecture allows for this network to connect to the traditional networks and allows for an upgrade path. The design of this architecture is robust and scalable so that this network can introduce new features and functionality while preserving the quality of traditional networks.

Service Layer

The service layer takes advantage of the network components in the RTIP network 120 to provide an environment for building a high performance, scalable and feature rich communication network. As the underlying network to the API already handles many duties of a telecom application, the service layer needs to worry only about the application itself. CAS 40, for example, handles resource allocation and locking issues, the IMCP protocol and GateLink API handle the complexities of manipulating resources in the network, and the CEs handle pre-digestion of the signal, relieving the application of any need for a DSP resource.

An example of how the service layer interacts with the network layer can be seen from the following description of a one number call. A one number call is the ability of a caller to dial a single number and have the one number application reach the subscriber at multiple numbers at once. The initiating caller will call a number assigned to the subscriber's one number service. This call will come into CE 50. CAS 40 will, based on the called number, route the call to an appropriate AppLink server and lock resources on both CE 50 and the AppLink server. The GateLink API will handle all the IMCP call controls to receive this call via "Wait for Call" and "Answer Call" API calls. With the call information delivered via the IMCP, the AppLink server will identify which user is being called and play the appropriate greeting. The "Play Prompt" API delivers saved frames from the caller via the IMCP-RT protocol. CE 50 will convert these saved frames into speech and the caller will hear the greeting. "Get DTMF digit" will wait for the caller to press a designated number to locate the subscriber. Separate "Make Call" API calls will call the subscriber. "Play Prompt" module will play a greeting of the caller previously recorded with "Record Prompt" and "get DTMF digit" module will await a response from the subscriber indicating that he is ready to receive the caller. The application will now have two sessions: one with CE 50*a* with the caller, and one with the subscriber. The applications will "Link Line" these two sessions, allowing the IMCP-RT packets to travel directly between the two CEs. The IMCP control session remains the same even though the RT packet paths have changed. All billing information specific to the application, such as what type of phone number did the subscriber answer, is passed to the CAS 40 and recorded. In addition, the call records for both the caller and subscriber contain a key indicating that they belong to the same session. It is noteworthy that the API "get DTMF digit" does not actually look at the signal or the Real Time packets. DTMF tones sent by the caller are identified by CE 50*a* and are also sent as messages via IMCP. The application can receive DTMF tones, even once the caller and subscriber are connected and IMCP-RT packets are transferred directly between CE 50*s*, thereby enabling DTMF direction across the lines.

Reference is next made to FIG. 2, block diagrams of the method and system for interconnecting a private IP communication network. FIG. 2*a* represents the control paths that are established between various network devices and central arbitration server (CAS) 40 as the network devices "log in" to the network. The continuous control line structure is illustrated for gateways 50*a* and 50*b*, the conference server 70, the V-Link enhanced service platform 60, and the CAS 40. These control lines determine whether or not a call may be connected and contain information concerning the phone conversation such as billing information without burdening the direct connection between the devices.

FIG. 2*b* demonstrates a variety of potential real time data paths that may exist between network devices. For example, gateway 50*a* may be connected directly with gateway 50*b*, or indirectly connected via the V-Link enhanced service platform 60, or the conference server 70. The real time data paths illustrated in FIG. 2*b* represent selective network connections and selective logical connections between the network devices, while the control path connections as depicted in FIG. 2*a* are full time connections between the network devices.

Figure 2D:
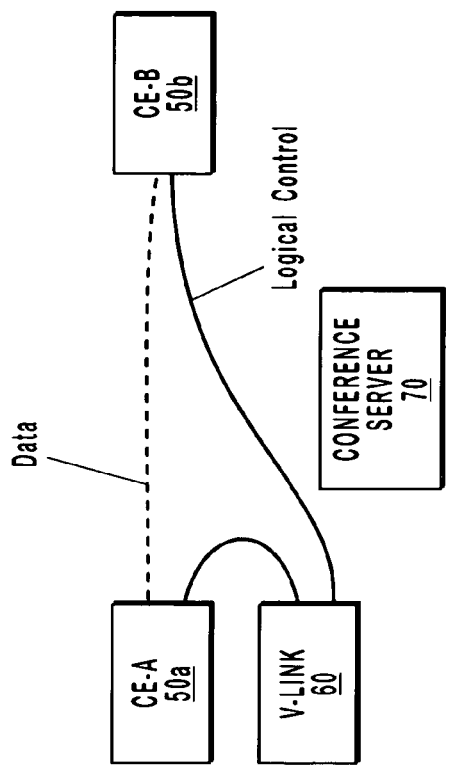
Figure 2C:
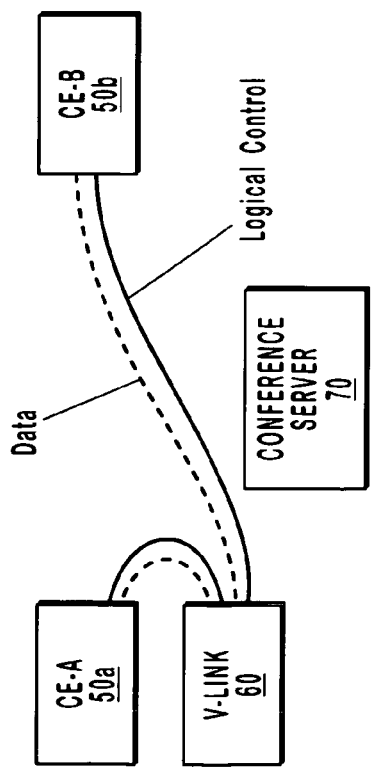

FIG. 2*c* illustrates the first step in creating a special service call using enhanced services V-Link server 60. Origination gateway 50*a* and destination gateway 50*b* connect to V-Link server 60 via data and logical control lines. V-Link server 60 is unique in its methodology and flexibility when interacting with other network devices. For example, a CE would deliver encoded packets from the PSTN connection, but V-Link server 60 delivers packets from a disk that play a greeting and instruct the origination and destination user. User input is received from the origination and destination gateways 50*a* and 50*b* via DTMF messages and user messages that are recorded to disk or memory, in essence building an IVR (Integrated Voice Response) environment. Based on DTMF input from the caller requesting to connect to the subscriber, the V-Link platform places an outgoing call in attempt to reach the subscriber to termination CE 50*b* (CAS decides this based on the telephone number of the subscriber). When the subscriber answers, the call is considered "Connected". There are now two connections to V-Link server 60: the origination caller connection and the subscriber connection and the connections between originator and subscriber remain active until the end of the call in one form or another.

With reference to FIG. 2*d*, once the destination subscriber answers the phone and accepts the originating call, there is a need to connect the two data lines. In a normal call the data path would follow the logical control path, that is, origination gateway 50*a* connects to destination gateway 50*b* and the "voice" data is also sent from origination gateway 50*a* to destination gateway 50*b*. But in the conference call situation, the network handles the call differently. Namely, V-Link server 60 will use the "LinkLine" command via CAS 40 to tell origination gateway 50*a* and destination gateway 50*b* to deliver "voice" data to each other while still maintaining a control path to V-Link server 60. So in a logical sense both the originating caller and destination subscriber are still connected to V-Link server 60, but their voice data path is redirected to each other. This allows V-Link server 60 to maintain supervision (both line and DTMF) of the call without having to route all the "voice" data through V-Link server 60.

Figure 2F:
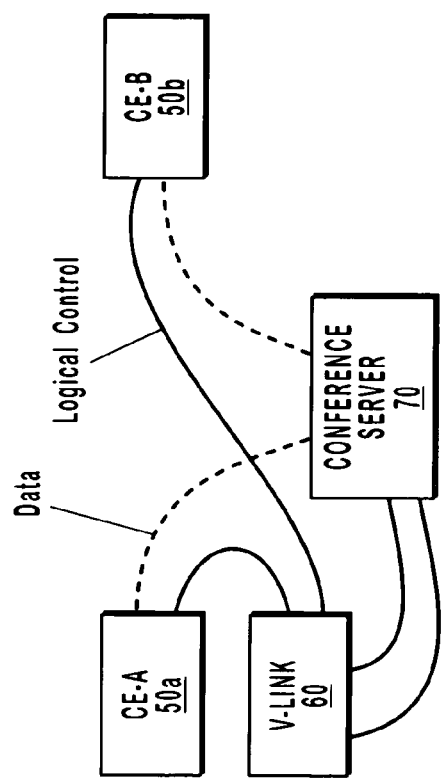
Figure 2E:
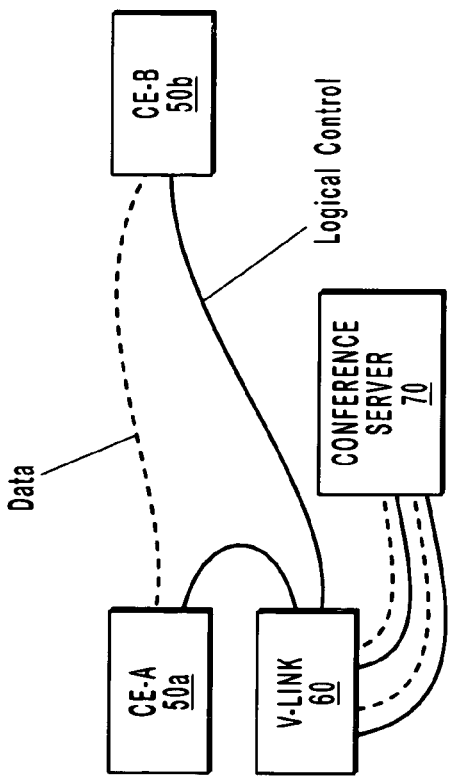

This comes in handy when the destination subscriber decides to create a simplified conference call as illustrated in 2*e* and 2*f*. A digit sequence, for example "00" alerts V-Link server 60 that the subscriber needs access to the system and uses "LinkLine" to connect both data path calls back to V-Link server 60. The caller will receive packets for music on hold and the subscriber will be in the IVR system associated with V-Link server 60. A menu system within the IVR system instructs the subscriber concerning the available services, including instructions on how to build a conference call. As a result of the subscribers input, the system in FIG. 2*e* creates two calls to conference server 70 via V-Link server 60. The first call to conference server 70 creates a new conference session identifier and the second call delivers the session identifier in a user field via IMCP, thereby placing both calls in the same conference. These calls remain for the duration of the conference call. Then V-link will use the "LinkLine" command to connect the data paths from V-Link to the Conference server, as depicted in FIG. 2*f*.

Figure 3:
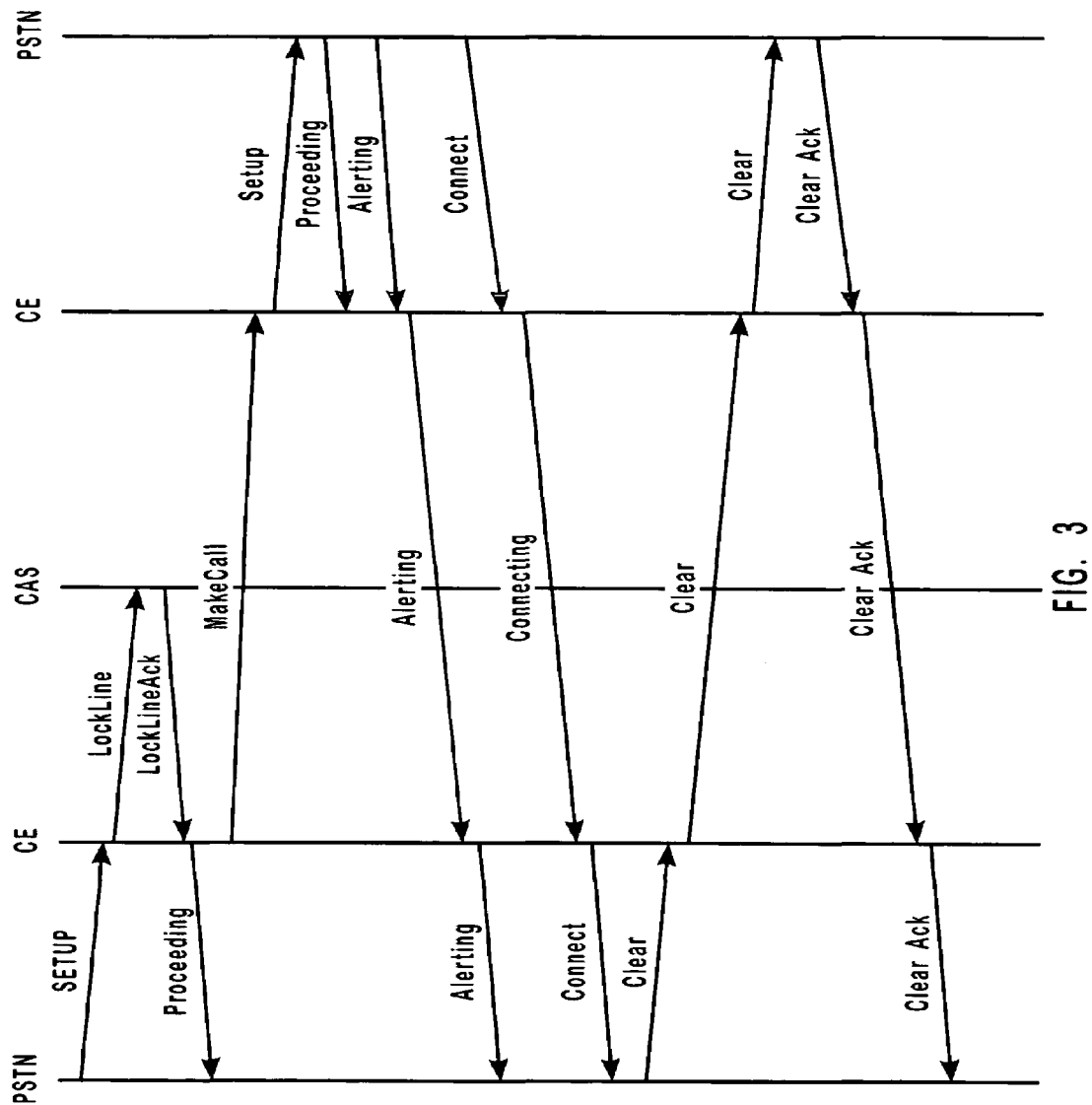
FIG. 3 is a timing diagram demonstrating a call.

Reference is now made to FIGS. 1 and 3. FIG. 3 illustrates a call flow chart indicating the process of establishing a phone call between a PSTN telephone user 10*a* to a second PSTN telephone user 10*b*. In this situation, a call is placed from the PSTN origination point 10*a*, the call travels through the CO 30*a* and arrives at the communication engine (CE) or gateway 50*a*.

FIG. 3 describes one embodiment of the call flow during an IMCP call setup session between two CEs (Gateways) 50 and CAS 40. When a first originating CE gateway 50*a* receives a call setup request from an attached PSTN line user 10*a*, the originating CE gateway initiates a "LockLine" signal request with enough calling information to CAS 40 to determine which terminating CE gateway 50 would be best suited to carry the call. Calling information includes information such as the destination phone number and the requested bandwidth. A LockLine signal request requires a network resource with specific parameters, such as destination phone number. CAS 40, based in part on its dynamic routing tables, determines the line availability in the closest available termination CE gateway to the call destination. The CAS allocates and acknowledges the resource availability with a "LockLineAck" signal message to the originating CE gateway, along with information corresponding to the termination CE gateway. For example, CAS 40 can transfer the IP address of the termination CE gateway to the originating CE gateway, enabling the network to create the real time connections to carry the media information directly between both IMCP endpoints. In turn, the originating CE gateway sends a "Proceeding" signal to the PSTN originating device. The CAS also marks the ports on both originating and termination CE gateways as locked, making them busy or inaccessible to subsequent calls.

This resource acknowledgement triggers a call request or "MakeCall" signal that is monitored by CAS 40 from the originating CE gateway 50*a* to the termination CE gateway 50*b*. Using this call request signal, the originating CE 50*a* can force or suggest the call parameters for the call. The termination CE 50*b* then initiates call "Setup" signal to connect with the PSTN destination. The PSTN destination acknowledges the "Setup" signal with a "Proceeding" signal followed by an "Alerting" signal. The termination CE 50*b* forwards the Alerting signal, monitored by CAS 40, along with additional call information to the originating CE 50*a*. The originating CE 50*a* forwards the Alerting signal to the originating PSTN subscriber. The while the timing diagram illustrated in FIG. 3 illustrates an accepted call, the call response signals may be one of a set of possible responses based on the success or failure in making the call. For example, "AcceptCall" may produce an Alerting signal while "ConnectCall" will indicate that the destination is connected or "ClearCall" is used when the line is busy or unavailable.

Following the Alerting signal, a "Connect" signal is transmitted from the destination PSTN to the termination CE gateway. The connecting signal is monitored by the CAS and then forwarded from the termination CE directly to the originating CE, which then forwards the Connect signal to the originating PSTN call point. Upon the end of a call, the "Clear" signal is sent from the originating PSTN to the originating CE. The originating CE forwards this "Clear" signal directly to the termination CE gateway, which then forwards the clear signal to the destination PSTN device. The destination PSTN device then transmits a "Clear Acknowledge" signal to the termination CE. The termination CE then transmits the clear acknowledge signal to the originating CE, which forwards the "Clear Acknowledge" signal to the originating PSTN. In all cases, the CAS monitors the call control signals so that CAS can accurately allocate network resources. The "Clear" signal is illustrated as being originated from the originating PSTN device and the "Clear Acknowledge" signal is illustrated as being generated by the destination PSTN device. However, the "Clear" or "Clear Acknowledge" signals may be originated from either the origination or destination device, depending on who ends the call first.

Resource allocation is the responsibility of CAS 40. If there is more than one CE 50 that could handle the termination, CAS 40 decides where to send the call. CAS 40 uses a database table that maps telephone number ranges from an NPA all the way down to a specific phone number for various end devices. If the devices are the same priority, the call load will be equally distributed, or if a different priority, the higher priority will be used until they are full, allowing overflow, class of service, failure bypass, and least cost routing. Least cost routing chooses the cheapest path for the data to be transmitted. Class of service assigns a prioritization to certain customer data types. Fore example, a customer "paying" for data payload would take priority over a "free access" data payload. Another routing method used to improve connections between end devices is failure bypass routing, commonly used to avoid portions of the network that are either not performing or are performing poorly, such as overloaded network sections that function below a user specified response performance parameter. Once the originating CE gateway receives the necessary information about the termination CE gateway from the CAS, the CAS observes certain call control messages that are passed between connected end devices via the IMCP. The CAS maintains call state information for each port, whether the port is idle, alerting, or connected. This call related port data is used for network monitoring and for billing information.

Billing information about the call is split into two parts: a base record and fields associated with the base record. The base record includes all the basic network level CDR information, such as call start-answer-end times, ports, machines, etc. Because this is a distributed application with many devices working together to deliver a service, time stamps on these call records are kept with millisecond accuracy. CAS 40 additionally implements a powerful concept of "fields" into its CDR. This allows communication applications via the IMCP to deliver to CAS 40 any number of additional fields on a per record basis. Enabling CAS 40 to collect billing information for any application without having to anticipate the application. A fax on demand application, for instance, could collect a list of documents each user sent. A unified messaging or voicemail application could bill by the number of messages the user listened to. These generic fields allow applications to use the high performance and reliability of CAS 40 without sacrificing information concerning related billing records. Since many applications, such as conferencing and multiple call legs associated with a single session (like a one number call), require more than one call record to record all legs of a call, CAS also has the ability to group call records using a key. All of the legs of a conference call could share the same key allowing a simpler bill to be sent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. In a dispersed Internet protocol network that supplies communication and data services across components that are electrically attached to a central arbitration server, a method of allowing communication applications to modify call detail records for services rendered on a per record basis by providing generic fields that allow the central arbitration server to collect billing information for any application without having to anticipate it, the method comprising:
    the step of initiating a control path connection on a network layer between individual components attached to the dispersed network and at least one central arbitration server for centralized arbitration of service requests received from the individual components;
    the step of receiving a service request;
    the step of initiating a data path connection between the individual components designated by the service request; and
    the step of the central arbitration server initiating a service layer to supply the requested service;
    the step of the central arbitration server generating a call detail record for the service request and populating one or more call detail record fields thereof by default; and
    the step of the central arbitration server allowing an application corresponding to the requested service to extend the one or more call detail record fields known to the central arbitration server by allowing the application to populate a generic filed within the call detail record with information specific to the requested service provided by the application in order to allow the application to add information on a per call detail record basis, wherein the generic field within the call detail record can be populated by a plurality of applications to add information specific to services offered by each of the plurality of applications.

2. The method as recited in claim 1, wherein the step of receiving a service request further comprises the step of determining whether the requested service will require real-time responsiveness.

3. The method as recited in claim 1, wherein the step of initiating a control path connection further comprises:
    the step of logging into the central arbitration server; and
    the step of delivering information concerning available resources associated with the individual components.

4. The method as recited in claim 1, wherein the step of initiating a control path connection further comprises the step of communicating call control information, DTMF, application specific messages, and application specific call detail information to the at least one central arbitration server.

5. The method as recited in claim 4, wherein the step of initiating a data path connection further comprises the step of establishing a real time data path between devices to deliver data packets containing voice, facsimile, DTMF tones, silence/background noises, modem data, and video data.

6. The method as recited in claim 4, further comprises the step of forwarding control path information to a termination device.

7. The method as recited in claim 4, further comprising:
    the step of recording call detail records based in part on received call control messages and application specific messages; and
    the step of monitoring the call control messages and other data derived from the control path connection and the data path connection.

8. The method as recited in claim 1, wherein the steps of initiating the data path and control path connections further comprise:
    the step of optimizing the routing resources available for the connection, wherein the optimization is determined according to at least one of the following data packet prioritization systems: least cost, failure bypass, load balancing, and class of service; and
    the step of determining the necessary bandwidth of the connection to be allocated for the requested service.

9. The method as recited in claim 1, wherein the step of initiating a connection further comprises:
    the step of reviewing service tables to determine if a requested resource required by the service request is available; and
    if the requested resource is available, the step of locking both sides of connection in preparation for supplying the requested service.

10. The method as recited in claim 9, wherein the steps of reviewing the service tables and locking both sides of connection is controlled via the arbitration server, such that the requested resource is locked by the arbitration server after verifying availability.

11. The method as recited in claim 9, wherein the step of locking both sides of connection in preparation for supplying the requested resource is locked by the individual components making the requests.

12. The method as recited in claim 1, wherein the step of initiating a data path connection further comprises:
    the step of encapsulating data into data packets for transmission across the distributed network.

13. The method as recited in claim 12, wherein the step of encapsulating data further comprises the step of determining a type of data being encapsulated into packets, wherein the type of data is at least one of: voice, DTMF tones, facsimile, background noise, digital data, modem and silence.

14. The method as recited in claim 12, wherein the step of encapsulating data further comprises:
the step of supplying signaling information about the destination of the packet;
the step of assigning a data type label to the packet;
the step of attaching data payload to the packet;
if the packet will be transmitted through a public network area, the step of encrypting the contents of the packet; and
the step of varying a call detail record based in part upon the data type label.

15. The method as recited in claim 12, wherein the step of encapsulating data further comprises:
the step of aggregating data payloads from one or more originating devices to the packet; and
the step of supplying signaling information about one or more packet destinations.

16. The method as recited in claim 15, wherein the step of encapsulating data further comprises:
the step of responding to a service request made by at least one originating device;
the step of linking data payloads from one or more originating devices to one or more terminating devices; and
the step of supplying signaling information about one or more packet destinations.

17. The method as recited in claim 16, wherein the step of encapsulating data further comprises:
the step of responding to a service request made by at least one originating device;
the step of disconnecting at least one linked data payload from one or more originating devices to one or more terminating devices; and
the step of supplying signaling information about one or more packet destinations.

18. A communication and data services network predominately using a packetized transmission protocol and allows communication applications to modify call detail records for services rendered on a per record basis by providing generic fields that allow a central arbitration server to collect billing information for any application without having to anticipate it, the communication and data network comprising:
means for requesting a communication data service;
means for initiating a network layer between attached components of the dispersed network, wherein the network layer initiates a control path for the attached components and a data path for select components designated in the requested communication data service, the means for initiating a network layer comprising (i) at least one central arbitration server (CAS) for centralized arbitration of service requests received from the means for requesting a communication data service, and (ii) a plurality of entry gateways (CE), wherein each CE performs digital signal processing on received signals to generate encoded packets and is connected to the at least one CAS via the control path, wherein the at least one CAS generates a call detail record for the requested communication data service and populates one or more call detail record fields thereof by default, and allows an application corresponding to the requested communication data service to extend the one or more call detail record fields known to the at least one CAS by allowing the application to populate a generic filed within the call detail record with information specific to service provided by the application in order to allow the application to add information specific to the requested service provided on a per call detail record basis, wherein the generic field within the call detail record can be populated by a plurality of applications to add information specific to services offered by each of the plurality of applications; and
means for initiating a service layer to supply the requested communication data service comprising at least one central arbitration server (CAS).

19. The network as recited in claim 18, wherein the means for requesting a communication data service comprises a user terminal, such as a telephone or personal computer.

20. The network as recited in claim 18, wherein the means for initiating a network layer connection comprises:
a POTS interface at the user terminal; and
a central office electrically attached to the POTS interface and one CE via a standard PSTN connection.

21. The network as recited in claim 18, wherein the means for initiating a network layer further comprises:
a communication proxy server (C4P) electrically attached to the CAS via the control path; and
a local digital switch (C4) being electrically attached to the C4P via the network, the C4 generating dial tone, digital access, and encoding data path information to the user terminal.

22. The network as recited in claim 18, wherein the packetized transmission protocol is an Internet Media Control Protocol (IMCP) running on the at least one CAS and the plurality of CEs, the IMCP pooling data into categorized packet types exchanged between servers along the available routing resources enabling multiple data path connections to share the same packet and determining the necessary bandwidth allocation for the requested communication data service.

23. The network as recited in claim 22, wherein the plurality of CEs, comprise:
one or more a communication proxy servers (C4Ps); and
one or more user terminals connected through a control layer to the one or more C4Ps.

24. The network as recited in claim 22, wherein the plurality of CEs, comprise:
one or more a communication proxy servers (C4Ps);
one or more a local digital switches (C4s) connected to the one or more C4Ps; and
one or more user terminals connected to the one or more C4s.

25. The network as recited in claim 18, wherein the means for initiating a network layer comprises the CAS reviewing service tables to determine if the requested resource is free and if the requested resource is free, allowing origination and termination devices making the resource request to lock both sides of the connection in preparation for supplying the requested resource.

26. The network as recited in claim 18, wherein the means for initiating a service layer connection comprises a gatelink application protocol interface, which enables applications resident on gatelink servers to analyze the encoded packets generated by the network layer.

27. The network as recited in claim 26, wherein the plurality of applications resident on gatelink servers connect with at least one CAS.

28. The network as recited in claim 27, wherein the plurality of applications resident on gatelink servers connect with one or more CEs.

29. The network as recited in claim 18, wherein the means for initiating a service layer connection directs the data path of the originating and terminating devices.

30. The network as recited in claim 18, wherein the means for initiating a network layer further comprises:
   a communication proxy server (C4P) electrically attached to the CAS via the control path; and
   a user terminal being electrically attached to the C4P via the network, the user terminal generating dial tone, digital access, and encoding data path information to the C4P.

31. The network as recited in claim 18, wherein the at least one CAS redirects the data path of the originating and terminating devices in real time with no service interruption.

32. The network as recited in claim 18, wherein the means for initiating a service layer connection redirects the data path of the originating and terminating devices in real time with no service interruption.

33. A global private packetized communication system with a control path and a real time data path, wherein the communication system allows communication applications to modify call detail records for services rendered on a per record basis by providing generic fields that allow the central arbitration server to collect billing information for any application without having to anticipate it, the communication system comprising:
   originating telephone means for transceiving a digitized audio signal;
   transmission means for transceiving, categorizing, compressing, and encapsulating digitized audio signals, wherein the transmission means generates a call detail record and populates it with one or more call detail record fields by default, and allows an application corresponding to a requested service to extend the one or more call detail record fields known to the transmission means by allowing the application to populate a generic filed within the call detail record with information specific to the requested service provided by the application in order to allow the application to add information on a per call detail record basis, wherein the generic field within the call detail record can be populated by a plurality of applications to add information specific to services offered by each of the plurality of applications; and
   receiving telephone means for transceiving a digitized audio signal.

34. The communication system as recited in claim 33, wherein the originating telephone means comprises a digital telephonic device electrically connected to the transmission means, the digital telephonic device comprising a speaker for converting digital signals into audio signals and a microphone for converting audio signals into digital signals; and wherein the receiving telephone means comprises a second digital telephonic device electrically connected to the transmission means, the second telephonic device also comprising a speaker for converting digital signals into audio signals and a microphone for converting audio signals into digital signals.

35. The communication system as recited in claim 33, wherein the transmission means for transceiving, categorizing, compressing, and encapsulating digitized voice signals comprises:
   at least one central arbitration server to track resource utilization; and
   at least one communication engine electrically connected to the at least one central arbitration server via the control path and selectively interconnected with a receiving communication engine via the real time data path, the selectively interconnected communication engines being electrically attached to the originating and receiving telephone means.

36. The communication system as recited in claim 35, wherein the transmission means further comprises:
   a proxy switch server electrically connected to the at least one central arbitration server via a control path and selectively connected to the receiving communication engine via real time data path, the proxy switch server consolidating data packets traveling to the same communication engine to improve the payload to header ratio; and
   a local digital switch electrically connected to the proxy switch server and one of the originating telephone means and the receiving telephone means, the local switch generating dial tone and compressing received digital voice signal into encapsulated digitized voice data packets.

37. The network as recited in claim 28, wherein the one or more CEs comprise at least one user terminal.

38. The network as recited in claim 28, wherein the one or more CEs comprise at least one a local digital switch C4.

39. The network as recited in claim 28, wherein the plurality of applications resident on gatelink servers connect with one or more a communication proxy servers (C4Ps).

* * * * *

UNITED STATES PATENT AND TRADEMARK OFFICE
CERTIFICATE OF CORRECTION

PATENT NO. : 7,215,663 B1
APPLICATION NO. : 09/655659
DATED : May 8, 2007
INVENTOR(S) : Radulovic It is certified that error appears in the above-identified patent and that said Letters Patent is hereby corrected as shown below:

Column 4
Line 32, before "address" insert --to--

Column 6
Line 5, change "is period" to --period is--

Column 7
Line 10, before "block" remove [a]
Line 40, change "operational" to --operationally--

Column 8
Line 54, change "ICMP" to --IMCP--

Column 10
Line 1, before "initiate" change "than" to --then--

Column 11
Line 6, change "devices" to --device--

Column 12
Line 64, change "GIF" to --.GIF--

Column 13
Line 7, change "95" to --94--
Line 9, change "95" to --94--
Line 11, change "95" to --94--
Line 14, change "95" to --94--

Column 17
Line 60, change "filed" to --field--

Column 19
Line 64, change "filed" to --field--

Column 20
Line 37, after "more" remove [a]
Line 42, after "more" remove [a]
Line 43, after "more" remove [a]

UNITED STATES PATENT AND TRADEMARK OFFICE
CERTIFICATE OF CORRECTION

PATENT NO. : 7,215,663 B1
APPLICATION NO. : 09/655659
DATED : May 8, 2007
INVENTOR(S) : Radulovic It is certified that error appears in the above-identified patent and that said Letters Patent is hereby corrected as shown below:

Column 21
Line 34, change "filed" to --field--

Column 22
Line 41, after "one" remove [a]
Line 44, after "more" remove [a]

Signed and Sealed this

Twenty Second Day of April, 2008

JON W. DUDAS
*Director of the United States Patent and Trademark Office*